(12) United States Patent
Givens et al.

(10) Patent No.: US 8,492,042 B2
(45) Date of Patent: Jul. 23, 2013

(54) FUEL CELL SYSTEMS AND METHODS FOR PROVIDING POWER AND COOLING TO AN ENERGY-CONSUMING DEVICE

(75) Inventors: James A. Givens, Bend, OR (US); Arne LaVen, Bend, OR (US)

(73) Assignee: Idatech, LLC, Bend, OR (US)

( * ) Notice: Subject to any disclaimer, the term of this patent is extended or adjusted under 35 U.S.C. 154(b) by 589 days.

(21) Appl. No.: 12/629,348

(22) Filed: Dec. 2, 2009

(65) Prior Publication Data

US 2011/0129745 A1   Jun. 2, 2011

(51) Int. Cl.
*H01M 8/06* (2006.01)
*H01M 8/04* (2006.01)

(52) U.S. Cl.
USPC .......... 429/434; 429/423; 429/428; 429/429; 429/433; 429/439; 429/440; 429/462

(58) Field of Classification Search
None
See application file for complete search history.

(56) References Cited

U.S. PATENT DOCUMENTS

| | | |
|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,522,019 A | 7/1970 | Buswell et al. |
| 3,655,448 A | 4/1972 | Setzer |
| 4,098,959 A | 7/1978 | Fanciullo |
| 4,098,960 A | 7/1978 | Gagnon |
| 4,175,165 A | 11/1979 | Adlhart |
| 4,179,896 A | 12/1979 | Buchner et al. |
| 4,214,969 A | 7/1980 | Lawrance |
| 4,468,235 A | 8/1984 | Hill |
| 5,401,589 A | 3/1995 | Palmer et al. |
| 5,432,710 A | 7/1995 | Ishimaru et al. |
| 5,637,414 A | 6/1997 | Inoue et al. |
| 5,678,410 A * | 10/1997 | Fujita et al. ................. 62/7 |
| 5,861,137 A | 1/1999 | Edlund |
| 5,997,594 A | 12/1999 | Edlund et al. |
| 6,083,637 A | 7/2000 | Walz et al. |

(Continued)

FOREIGN PATENT DOCUMENTS

| | | |
|---|---|---|
| EP | 0995944 A2 | 4/2000 |
| WO | WO 01/88455 A1 | 11/2001 |

OTHER PUBLICATIONS

International Search Report and Written Opinion for PCT Patent Application Serial No. PCT/US10/58666, dated Feb. 8, 2011.

*Primary Examiner* — Jeffrey Wollschlager
(74) *Attorney, Agent, or Firm* — Dascenzo Intellectual Property Law, P.C.

(57) ABSTRACT

Fuel cell systems and methods for providing power to an energy-consuming device and cooling of the energy-consuming device utilizing the endothermic process of desorbing hydrogen gas from a hydride bed. Fuel cell systems include a fuel cell stack, a hydrogen storage device having a volume of a hydrogen storage material, and a heat exchange system operatively connected to the hydrogen storage device and configured to heat the hydrogen storage material to desorb hydrogen gas therefrom for delivery to the fuel cell stack. The heat exchange system is further configured to deliver a cooled fluid stream to the energy-consuming device for cooling thereof. The cooled fluid stream may be produced, or cooled, by the endothermic desorption of hydrogen gas from the hydrogen storage device. In some fuel cell systems, the heat exchange system utilizes heat from the energy-consuming device to heat the hydrogen storage material for desorption of hydrogen gas therefrom.

11 Claims, 2 Drawing Sheets

U.S. PATENT DOCUMENTS

| | | | |
|---|---|---|---|
| 6,195,999 B1 * | 3/2001 | Arnold et al. | 60/649 |
| 6,221,117 B1 | 4/2001 | Edlund et al. | |
| 6,319,306 B1 | 11/2001 | Edlund et al. | |
| 6,376,113 B1 | 4/2002 | Edlund et al. | |
| 6,378,601 B1 | 4/2002 | Ovshinsky et al. | |
| 6,383,670 B1 | 5/2002 | Edlund et al. | |
| 6,494,937 B1 | 12/2002 | Edlund et al. | |
| 6,495,277 B1 | 12/2002 | Edlund et al. | |
| 6,522,955 B1 | 2/2003 | Colborn | |
| 6,562,111 B2 | 5/2003 | Edlund et al. | |
| 6,617,066 B2 | 9/2003 | Sugawara | |
| 6,737,184 B2 | 5/2004 | Rusta-Sellehy et al. | |
| 6,746,645 B2 * | 6/2004 | Ovshinsky et al. | 420/402 |
| 6,746,790 B2 | 6/2004 | Colborn | |
| 6,841,276 B2 | 1/2005 | Colborn | |
| 6,918,430 B2 * | 7/2005 | Myasnikov et al. | 165/104.12 |
| 6,929,785 B2 | 8/2005 | Grieve et al. | |
| 7,011,693 B2 | 3/2006 | Mallavarapu et al. | |
| 7,011,903 B2 | 3/2006 | Benson et al. | |
| 7,045,230 B2 | 5/2006 | Rusta-Sellehy et al. | |
| 7,108,933 B2 | 9/2006 | Gelsey | |
| 7,240,492 B2 | 7/2007 | Johnson | |
| 7,405,013 B2 * | 7/2008 | Yang et al. | 429/421 |
| 2002/0114984 A1 | 8/2002 | Edlund et al. | |
| 2003/0091876 A1 | 5/2003 | Rusta-Sellehy et al. | |
| 2003/0091879 A1 | 5/2003 | Rusta-Sellehy et al. | |
| 2003/0162059 A1 | 8/2003 | Gelsey | |
| 2003/0207161 A1 | 11/2003 | Rusta-Sallehy et al. | |
| 2004/0247961 A1 * | 12/2004 | Edlund | 429/22 |
| 2005/0014040 A1 * | 1/2005 | Kaye | 429/20 |
| 2005/0079397 A1 | 4/2005 | Winkelmann et al. | |
| 2005/0253019 A1 * | 11/2005 | Hoehne et al. | 244/129.1 |
| 2005/0271916 A1 * | 12/2005 | Yang et al. | 429/20 |
| 2006/0280993 A1 * | 12/2006 | Keefer et al. | 429/34 |
| 2007/0264546 A1 * | 11/2007 | LaVen | 429/22 |
| 2008/0268303 A1 | 10/2008 | Eickhoff | |
| 2008/0299420 A1 * | 12/2008 | Kelley et al. | 429/13 |
| 2009/0297895 A1 * | 12/2009 | McLean et al. | 429/13 |
| 2010/0304239 A1 * | 12/2010 | Perry | 429/423 |

* cited by examiner

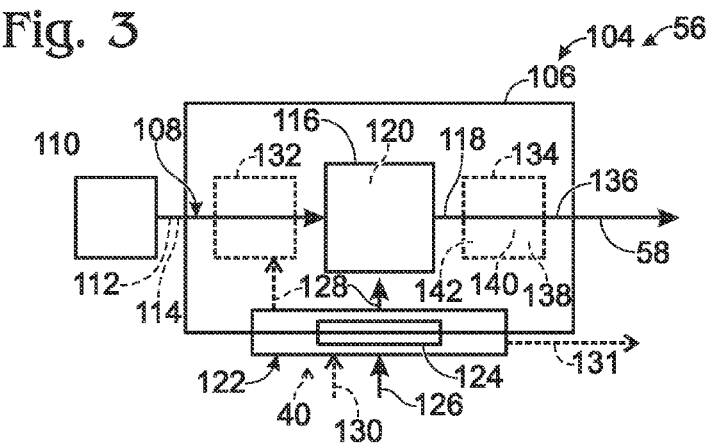
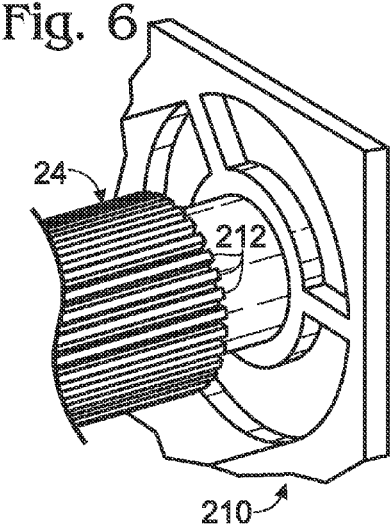
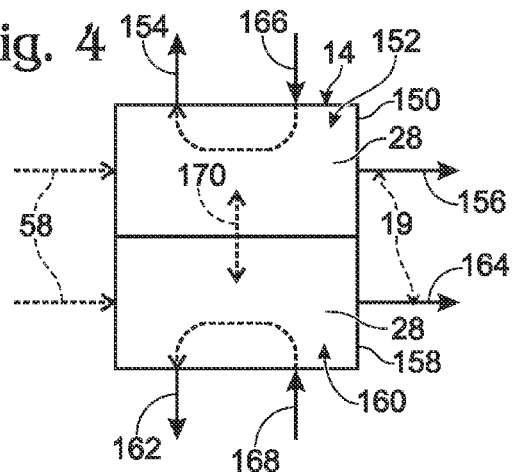
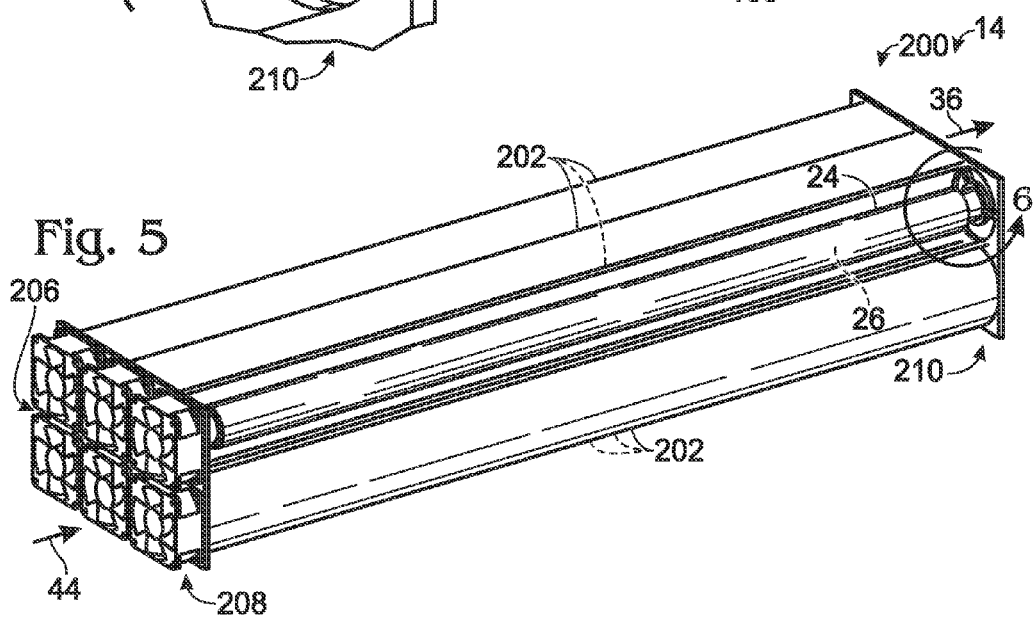

FUEL CELL SYSTEMS AND METHODS FOR PROVIDING POWER AND COOLING TO AN ENERGY-CONSUMING DEVICE

FIELD OF THE DISCLOSURE

The present disclosure is directed to fuel cell systems for, and methods of providing power and cooling to, an energy-consuming device, and more particularly to fuel cell systems and methods that utilize the endothermic process of desorbing hydrogen gas from a volume of hydrogen storage material to cool an energy-consuming device.

BACKGROUND OF THE DISCLOSURE

With today's dependence on technology, such as telecommunications systems, computer systems, network systems, etc., it may be detrimental if such systems lose power, and in some instances, even if just for a brief period of time. It is known to provide backup power systems that automatically fulfill the demand of an energy-consuming device, such as a component of one of the aforementioned systems, when a primary power source, such as an electrical grid, becomes unavailable. It is also known to utilize fuel cell systems as such backup power systems.

Electronics are often very temperature sensitive and also may generate heat during use. Accordingly, they may require cooling, and often may require a significant amount of cooling, to prevent failure of the electronics. Such cooling typically requires operation of an electrically powered air conditioning system, for example, a typical air conditioning system that operates on a refrigeration cycle. However, such air conditioning systems demand a large amount of power, and together with the power requirements of the electronics themselves, may require a backup power system having an extremely large capacity.

SUMMARY OF THE DISCLOSURE

Fuel cell systems and methods according to the present disclosure are configured to provide power to an energy-consuming device and to cool the energy-consuming device utilizing the endothermic process of desorbing hydrogen gas from a hydrogen storage material, such as a hydride bed. Accordingly, fuel cell systems according to the present disclosure include a fuel cell stack configured to produce an electrical output, a hydrogen storage device including a volume of a hydrogen storage material, and a heat exchange system operatively connected to the hydrogen storage device and configured to heat the hydrogen storage material to desorb hydrogen therefrom. The desorbed hydrogen gas may be used for a variety of applications, including being delivered to the fuel cell stack to produce an electrical output therefrom, such as may be used to satisfy at least a portion of the applied load from the energy-consuming device. Moreover, the heat exchange system is operatively associated with the hydrogen storage device to utilize the endothermic desorption process to produce a cooled fluid stream for delivery to the energy-consuming device for cooling thereof. In some examples of fuel cell systems according to the present disclosure, the heat exchange system utilizes heat from the energy-consuming device to heat the hydrogen storage material for desorption of hydrogen gas therefrom. In some examples, a closed loop heat exchange system is provided that circulates air, or other fluid, between the hydrogen storage device and the energy-consuming device. Other configurations of fuel cell systems and corresponding methods are also disclosed herein.

BRIEF DESCRIPTION OF THE DRAWINGS

FIG. 3 is a schematic diagram of an illustrative, non-exclusive example of a hydrogen source according to the present disclosure including a steam reforming fuel processor that may be used with or in fuel cell systems according to the present disclosure, and with which methods according to the present disclosure may be utilized.

FIG. 4 is a schematic diagram of an illustrative, non-exclusive example of a hydrogen storage device that may be used in fuel cell systems according to the present disclosure, the illustrated hydrogen storage device including more than one hydride bed, and with which methods according to the present disclosure may be utilized.

FIG. 5 is an isometric view of an illustrative, non-exclusive example of a hydrogen storage device that may be used in fuel cell systems according to the present disclosure, the illustrated hydrogen storage device including more than one hydride bed, and with which methods according to the present disclosure may be utilized.

FIG. 6 is a detail view of a portion of the hydrogen storage device of FIG. 5.

DETAILED DESCRIPTION AND BEST MODE OF THE DISCLOSURE

Figure 1:
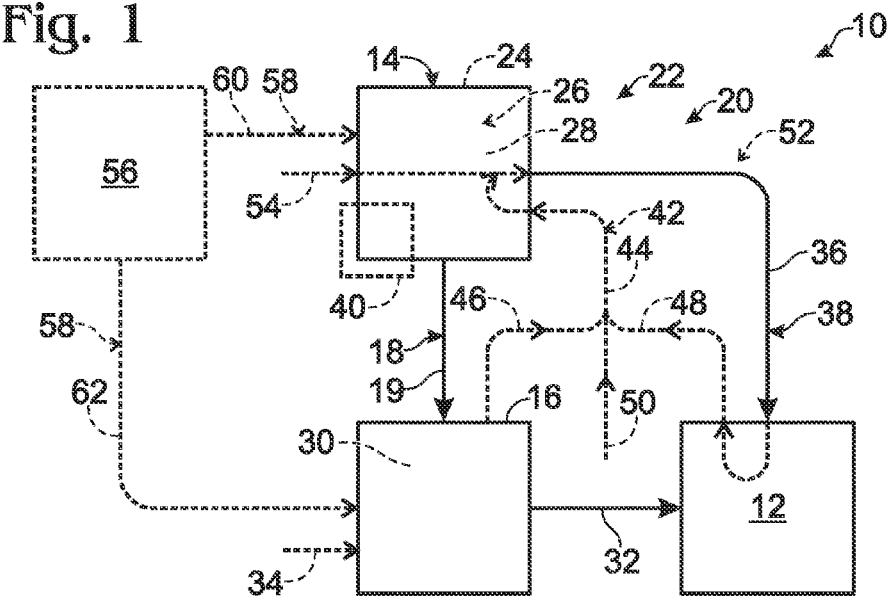
FIG. 1 is a schematic diagram of illustrative, non-exclusive examples of fuel cell systems according to the present disclosure, and with which methods according to the present disclosure may be utilized, schematically illustrated together with an energy-consuming device and an optional hydrogen source.

Fuel cell systems according to the present disclosure are schematically illustrated in FIG. 1 and are indicated generally at 10. Fuel cell systems 10 according to the present disclosure are designed to power one or more energy-consuming devices 12 and to cool the one or more energy-consuming devices 12 utilizing the endothermic process of desorbing hydrogen gas from a hydrogen storage device 14, which may include at least one hydride bed. Accordingly, fuel cell systems 10 include at least hydrogen storage device 14, one or more fuel cell stacks 16, a hydrogen delivery conduit 18 for delivering a hydrogen gas stream 19 from the hydrogen storage device 14 to the one or more fuel cell stacks 16, and a heat exchange system 20 for heating the hydrogen storage device and/or cooling the one or more energy-consuming devices. Some fuel cell systems 10 may further include, or be described as including, a control system 22.

Energy-consuming devices 12 that are powered and cooled by fuel cell systems 10 according to the present disclosure may take any suitable form and may utilize the received electrical output for a variety of purposes. Illustrative, non-exclusive examples of energy-consuming devices 12 include electronics that produce heat during operation and are temperature sensitive in that they generally need to be maintained below a threshold temperature for functional operation. Sometimes, such electronics and other equipment may be housed within one or more enclosures. Accordingly, fuel cell systems 10 according to the present disclosure may be configured to power the equipment housed within the enclosure while cooling the interior of the enclosure, and thus the equipment itself. That is, energy-consuming devices may be directly or indirectly cooled by fuel cell systems according to the present disclosure. This cooling may be provided on a variety of bases, such as continuously, periodically, intermittently, responsive to the temperature of the energy-consuming device(s) (or an enclosure therefor), and/or responsive to an electrical grid or other primary power source being, or becoming, unavailable to power an air conditioner or other primary cooling device. Electronics and other equipment used in telecommunications installations are illustrative, non-exclusive examples of energy-consuming devices that may be powered and cooled by fuel cell systems according to the present disclosure, but other types and configurations of energy-consuming devices, such as (but not limited to) computers, computer networks, and other computing equipment, are also within the scope of the present disclosure.

Hydrogen storage devices 14 according to the present disclosure are configured to store and selectively deliver or otherwise release hydrogen gas, such as for use as a combustible fuel and/or for use as a reactant to produce an electrical output in one or more fuel cell stacks 16. Specifically, hydrogen storage devices 14 according to the present disclosure may include one or more vessels, or shells, 24, each vessel containing a volume, or quantity, of hydrogen storage material 28 therein, such as in one or more hydride beds 26 capable of storing an amount of hydrogen gas. The amount of hydrogen gas that a hydrogen storage device 14 may store may be referred to herein as the capacity of the hydrogen storage device. As used herein, "hydride bed" refers to a volume of hydrogen storage material that is configured to repeatedly and selectively absorb and/or adsorb hydrogen gas, regardless of whether any hydrogen gas is presently absorbed and/or adsorbed by the hydrogen storage material. Absorption and adsorption may collectively or individually be referred to herein as sorption, and likewise absorbing and/or adsorbing may be referred to herein as sorbing and to absorb and/or to adsorb may be referred to herein as to sorb.

Any suitable hydrogen storage material 28 that is configured to selectively sorb hydrogen gas for storage in the hydrogen storage device and to selectively desorb hydrogen gas for delivery to the one or more fuel cell stacks 16 via the hydrogen delivery conduit 18 is within the scope of the present disclosure. An illustrative, non-exclusive example of a suitable hydrogen storage material includes lithium nickel alloy (e.g., $LaNi_5$). Other metal alloys and non-metal hydrogen storage materials are also within the scope of the present disclosure. Representative examples of hydrogen storage materials are generally classified into five families: A, $A_2B$, AB, $AB_2$, and $AB_5$, in which A is an early transition metal, a rare-earth metal, or magnesium, and in which B is aluminum, chromium, cobalt, iron, nickel or manganese. Other types of hydrogen storage materials are also within the scope of the present disclosure, and the present disclosure is not limited to the described five families. Typically during sorption by a hydrogen storage material, depending on the properties of a particular hydrogen storage material, hydrogen gas is first dissociatively adsorbed on the surface of the storage material and then hydrogen atoms diffuse into, or are absorbed by, the hydrogen storage material. When sorbed, or dissolved, the hydrogen atoms may take the form of a random, disorganized solid solution or an ordered hydride structure, either of which may allow for a high density volume of the hydride.

Sorbing of hydrogen gas by a hydrogen storage material is an exothermic process. Accordingly, to charge a hydride bed with a volume of hydrogen gas at a given pressure, generally heat must be removed from the hydride bed and the hydrogen storage material. The removal of heat may be provided by an air conditioning system, such as that delivers a cooled fluid stream to the hydrogen storage device, or simply by ambient air, depending on the temperature of the ambient environment. Other configurations for recharging the hydrogen storage device with hydrogen gas are also within the scope of the present disclosure.

Conversely, desorbing hydrogen gas from a hydrogen storage material is an endothermic process, and therefore a heat source may be used to promote release of hydrogen gas from the hydrogen storage material and to thereby maintain the hydride bed at a suitable temperature to continue the desorption of hydrogen gas after the endothermic process commences. As discussed herein, heat exchange systems 20 according to the present disclosure are configured to provide at least the necessary heat to selectively desorb hydrogen gas from a hydride bed of a hydrogen storage device, and in some examples (although not required to all examples) also provide the necessary cooling of a hydride bed for selective sorbing of hydrogen gas by the hydrogen storage material in the hydrogen storage device.

The sorbing and desorbing of hydrogen gas to and from a hydrogen storage material may be expressed in terms of the van't Hoff equation: $\ln(P) = \Delta H/RT - \Delta S/R$, in which P is the dissociation pressure, $\Delta H$ is the change in enthalpy, R is the gas constant, T is the absolute temperature, and $\Delta S$ is the change in entropy. Accordingly, the direction of the hydrogen gas sorption/desorption process may be determined both by the temperature and the pressure of the hydrogen gas. At a given temperature, if the pressure is above an equilibrium pressure, hydrogen gas will be sorbed by the hydrogen storage material, and if the pressure is below an equilibrium pressure, hydrogen gas will be desorbed from the hydrogen storage material. Conversely, at a given pressure, as may be typical of a fuel cell system 10 according to the present disclosure, if the temperature is below a threshold temperature, hydrogen gas will be sorbed by the hydrogen storage material, and if the temperature is above a threshold temperature, hydrogen gas will be desorbed from the hydrogen storage material.

Fuel cell stacks 16 according to the present disclosure include at least one, and typically multiple, fuel cells 30 that are configured to produce an electrical output from a source of protons, such as hydrogen gas, and an oxidant, such as air, oxygen enriched air, or oxygen gas. This electrical output additionally or alternatively may be referred to as an electric current, a power output, and/or electricity that is produced by the fuel cell stack. Accordingly, a fuel cell stack 16 may produce an electrical current 32 from hydrogen gas delivered from the hydrogen storage device 14 via the hydrogen delivery conduit 18 and a stream of air 34. As schematically illustrated in FIG. 1, the electrical output is delivered to the one or more energy-consuming devices 12 to at least partially satisfy an electrical demand, or load, of the one or more energy-consuming devices. The electrical devices may additionally or alternatively be described as applying a load, which may be referred to as an applied load, to the fuel cell system and/or to the fuel cell stack therein, with the electrical output of the fuel cell stack being used to satisfy at least a portion, or even all, of the applied load. Illustrative, non-exclusive examples of suitable fuel cells that may be used in fuel cell stacks according to the present disclosure include proton exchange membrane (PEM) fuel cells and alkaline fuel cells. Other examples include solid oxide fuel cells, phosphoric acid fuel cells, and molten carbonate fuel cells.

As mentioned, heat exchange systems 20 according to the present disclosure are configured to heat the hydrogen storage device 14 to a suitable temperature for selective desorption of hydrogen gas from a hydride bed and to cool the one or more energy-consuming devices 12 utilizing the endothermic process of the desorbing of hydrogen gas from the hydride bed. For example, the heat exchange system may use the desorbed hydration gas and/or a fluid stream in thermal communication with the hydrogen storage device and/or the desorbed hydrogen gas to provide a cooled fluid stream for delivery as a heat exchange stream to cool the one or more energy-consuming devices. A heat exchange system 20 of a fuel cell system 10 may therefore be described as being operatively connected to the hydrogen storage device to heat the hydride bed and the hydrogen storage material therein to desorb hydrogen gas therefrom, such as for delivery to the fuel cell stack. Additionally, heat exchange systems 20 according to the present disclosure may be described as being operatively configured to produce a cooled fluid stream 36 from the endothermic process associated with desorbing hydrogen gas from the hydrogen storage material. Accordingly, heat exchange systems 20 include a cooling conduit 38 for delivering the cooled fluid stream 36 to the one or more energy-consuming devices, as schematically illustrated in FIG. 1. Depending on the configuration of a heat exchange system 20 according to the present disclosure, the cooled fluid stream may be a cooled liquid stream, a cooled gas stream, or a cooled fluid stream that includes liquid and gaseous components. The cooled fluid stream may be delivered for cooling the energy-consuming devices without returning the stream to the heat exchange system for recooling and reuse to cool the energy-consuming device(s). It is also within the scope of the present disclosure that the cooled fluid stream may form part of a closed loop heat exchange system between the hydrogen storage device and the one or more energy-consuming devices 12.

A heat exchange system 20 may obtain and deliver the necessary heat for the selective desorption of hydrogen gas from the hydrogen storage material from any suitable source, which may be referred to herein as a heat source. For example, a heating assembly 40 may be positioned adjacent to, and in thermal communication with, hydrogen storage device 14, may be positioned apart from, yet in thermal communication with, hydrogen storage device 14, or may be within or even integral to hydrogen storage device 14 to directly heat a hydride bed 26 of the hydrogen storage device 14. Illustrative, non-exclusive examples of suitable heating assemblies that may be used to heat hydride beds include (but are not limited to) electric resistance heaters and burners. In FIG. 1, heating assembly 40 is schematically shown in an overlapping relationship with hydrogen storage device 14 to graphically represent that it is within the scope of the present disclosure that heating assembly 40 may be located partially or completely within hydrogen storage device 14, such as being at least partially within vessel 24, and/or that at least a portion, or all, of the heating assembly may be located external the hydrogen storage device. For example, as discussed herein, it is within the scope of the present disclosure that a burner or other heating assembly of an associated fuel processor may be used to heat hydrogen storage device 14.

Additionally or alternatively, a heat exchange system 20 may include a heat delivery conduit 42 for delivering a heated fluid stream 44 to the hydrogen storage device for the selective desorption of hydrogen gas from the hydrogen storage material. Such a heated fluid stream may be heated from any suitable source of heat, illustrative, non-exclusive examples of which are schematically illustrated in FIG. 1. For example, as schematically illustrated at 46, the heated fluid stream may deliver heat generated by a fuel cell stack 16 from the production of the electrical output 32. Stated differently, when the fuel cell stack is producing the electrical output, the fuel cell stack also may be producing a heated fluid stream that is delivered to the hydrogen storage device to heat the hydrogen storage device and thus promote desorption of hydrogen gas therefrom.

Additionally or alternatively, as schematically illustrated at 48, the heated fluid stream may deliver heat generated by an energy-consuming device 12. That is, the one or more energy-consuming devices 12, which are cooled by a fuel cell system 10, may provide the heat for the endothermic desorption process that generates the cooled fluid stream 36 for cooling the one or more energy-consuming devices. Additionally or alternatively, as schematically illustrated at 50, the heated fluid stream may deliver heat from a source other than a fuel cell stack 16 and/or an energy-consuming device 12, illustrative, non-exclusive examples of which include an ambient environment adjacent the fuel cell system 10, a heating assembly of a fuel processor, etc. Other sources of heat are also within the scope the present disclosure. An illustrative, non-exclusive example of such a heat source is a heat reservoir containing a volume of phase change material that may be used as a thermal energy, or heat, source. This phase change material may be heated by any suitable heat source and/or mechanism, such as those discussed herein, and may provide a thermal reservoir that may be used to provide heating of the hydrogen storage material.

Heated fluid stream 44 according to the present disclosure may be in the form of a heated gas stream, such as a heated air stream. Additionally or alternatively, heated fluid stream 44 may be in the form of a heated liquid stream. In either of such examples, as mentioned, the heated fluid stream may (but is not required to) form a closed loop heat exchange system 52 between the hydrogen storage device 14 and the one or more energy-consuming devices 12. This is schematically represented in FIG. 1 by the illustrated closed loop extending into the schematic representations of the hydrogen storage device 14 and the one or more energy-consuming devices 12, and including heated fluid stream 44 and cooled fluid stream 36. As used herein, "closed loop heat exchange system" is not limited to systems in which the heat transfer fluid is hermetically sealed within a closed loop of fluid conduits. For example, a heat exchange system 20 that utilizes air from an enclosure of one or more energy-consuming devices to form the heated fluid stream 44, which subsequently is returned to the enclosure in the form of the cooled fluid stream 36, is within the scope of a closed loop heat exchange system, even if the enclosure of the one or more energy-consuming devices is not hermetically sealed from the ambient environment and some air is gained and/or lost from/to the ambient environment in, or adjacent to, the enclosure. Accordingly, it is within the scope of the present disclosure that a closed loop heat exchange system may refer to a heat exchange system in which at least a portion of the heat transfer fluid is recycled between the hydrogen storage device and the one or more energy-consuming devices.

In examples of fuel cell systems 10 according to the present disclosure in which a cooled air stream is delivered to the one or more energy-consuming devices 12, at least a portion of the air that forms the cooled air stream may be drawn from an ambient environment adjacent the fuel cell system, such as schematically illustrated as an air stream 54 in FIG. 1. Air stream 54 may (but is not required to) contribute at least partially to the heating of the hydrogen storage material for desorption of hydrogen gas therefrom and thus the cooling of the air stream 54 to become cooled fluid stream 36. That is, when an air stream 54 is utilized by a fuel cell system 10, an additional source of heat, separate and apart from the air stream 54, may also contribute to the heating of the hydrogen storage material for desorption of hydrogen gas therefrom.

As mentioned, fuel cell systems 10 according to the present disclosure may (but are not required in all embodiments to) include a control system 22. Control systems 22 are configured to control, or regulate, during operation of a fuel cell system 10, at least one or more of sorption of hydrogen gas by the hydrogen storage material 28, desorption of hydrogen gas from the hydrogen storage material 28, delivery of hydrogen gas to the fuel cell stack 16, heating of the hydrogen storage material 28, and delivery of the cooled fluid stream 36 to the one or more energy-consuming devices 12. Control systems 22 according to the present disclosure may additionally or alternatively control other aspects of fuel cell systems 10. Illustrative, non-exclusive examples of actions that may be controlled, or regulated, by a control system include (but are not limited to) the initiation, rate, and/or cessation of delivery (i) of the heated fluid stream to the hydrogen storage device, (ii) of the cooled fluid stream to the one or more energy consuming devices, (iii) of hydrogen gas to one or more of the hydrogen storage device and the fuel cell stack, (iv) of electrical current to the one or more energy-consuming devices and/or other components of, or related to, fuel cell systems 10, etc.

Control systems 22 according to the present disclosure may include one or more of valves, conduits, regulators, manifolds, controllers, sensors, electronics, software, computers, wires, and/or other components suitable for regulating or otherwise controlling various aspects of fuel cell systems 10 according to the present disclosure. Accordingly, a "control system," as used herein, may be defined to include one or more other components or portions of other components of fuel cell systems 10. For example, a control system 22 may be defined to include conduits leading to and from the hydrogen storage device, such as the hydrogen delivery conduit 18, the cooling conduit 38, the heat delivery conduit 42, etc., conduits leading to and from the one or more energy-consuming devices 12, etc. That is, a control system 22 of a fuel cell system 10 may include structure that is separately defined herein, and a control system 22 of a fuel cell system 10 according to the present disclosure should not be interpreted necessarily as a stand-alone component of a fuel cell system 10, for example, when recited in a claim herein, although it is within the scope of the present disclosure that it may (but is not required to be) so implemented.

Fuel cell systems 10 according to the present disclosure may additionally (but are not required to) include a hydrogen source 56. As schematically illustrated in FIG. 1, hydrogen source 56, when present, may be configured to supply, or selectively supply, a hydrogen gas stream 58 (which also may be referred to herein as a hydrogen stream 58) to one or both of the hydrogen storage device 14 and the one or more fuel cell stacks 16. That is, a hydrogen source 56 according to the present disclosure may be a source of hydrogen gas for storage in the hydride bed 26 of the hydrogen storage device 14 and/or may be a source of hydrogen gas for delivery to the one or more fuel cell stacks 16 without such hydrogen gas first being stored in the hydrogen storage device. This is schematically represented by a first optional hydrogen delivery stream 60 illustrated in FIG. 1 between the hydrogen source 56 and the hydrogen storage device 14, and a second optional hydrogen delivery stream 62 illustrated in FIG. 1 between the hydrogen source 56 and the one or more fuel cell stacks 16.

Illustrative, non-exclusive examples of suitable hydrogen sources 56 according to the present disclosure include volumes of stored hydrogen gas, such as stored in a pressure vessel or other storage device or hydrogen reservoir, and fuel processors that are configured to generate hydrogen gas, for example from a carbon-containing feedstock and/or water. Other configurations of hydrogen sources are also within the scope of the present disclosure.

In some examples of fuel cell systems 10 according to the present disclosure, a hydrogen source 56 may deliver hydrogen gas, such as in a hydrogen gas stream 58, to the hydrogen storage device 14 and/or a fuel cell stack 16 in response to a predetermined criterion. For example, when the amount (e.g., volume, mass, etc.) of hydrogen gas stored in a hydride bed falls below a predetermined threshold (as may be detected via any suitable mechanism and with any suitable device), the hydrogen source may selectively supply hydrogen gas to the hydrogen storage device to recharge a hydride bed therein. Additionally or alternatively, when the amount of hydrogen gas stored in a hydride bed falls below a predetermined threshold, the hydrogen source may selectively supply hydrogen gas to a fuel cell stack 16, such as to at least partially or even completely satisfy the fuel cell stack's demand for hydrogen gas. For example, a control system 22 according to the present disclosure may be configured to selectively deliver hydrogen gas from the hydrogen source to the one or more fuel cell stacks in response to the hydrogen storage device containing insufficient hydrogen gas to satisfy a hydrogen demand of the fuel cell stack to satisfy a load applied by the energy-consuming device. Additionally or alternatively, optional control system 22 may be configured to selectively deliver hydrogen gas from the hydrogen source to the hydrogen storage device when an amount (e.g., volume or mass) of hydrogen gas sorbed by the hydrogen storage material falls below a predetermined threshold.

Additional illustrative, non-exclusive examples of other criterion include (but are not limited to) a threshold (applied) load that is applied by the one or more energy-consuming devices 12 to the one or more fuel cell stacks 16, a capacity, or output, of the one or more fuel cell stacks 16, a capacity, or output, of the hydrogen storage device 14, and a capacity, or output, of the hydrogen source 56. As used herein, a capacity of a fuel cell stack refers to an electrical output by a fuel cell stack under given conditions, which may include the load of the one or more energy-consuming devices, the availability of hydrogen gas from the hydrogen storage device, the availability of hydrogen gas from the hydrogen source, the availability of an electrical output from an associated battery or batteries, and/or other conditions of fuel cell systems 10, components thereof, and/or of related systems or components. As used herein, a capacity of a hydrogen storage device may refer to the availability of an amount of hydrogen gas at a given flow rate under given conditions of fuel cell systems 10, of components thereof, and/or of related systems or components. Illustrative, non-exclusive examples of conditions associated with one or more components of a fuel cell system include (but are not limited to) the operating state of one or more various components of a fuel cell system 10, predetermined values, thresholds, and/or ranges of values of such illustrative, non-exclusive conditions as ambient environmental conditions and/or internal conditions of a component such as temperature and pressure, volume and/or mass of hydrogen stored in the hydrogen storage device, etc. As such, a "given" condition may refer to a current (or present) condition, a predetermined condition, a threshold condition, etc. without departing from the scope of the present disclosure. Other criteria for determining selective supply of hydrogen gas from a hydrogen source are also within the scope of the present disclosure.

Figure 2:
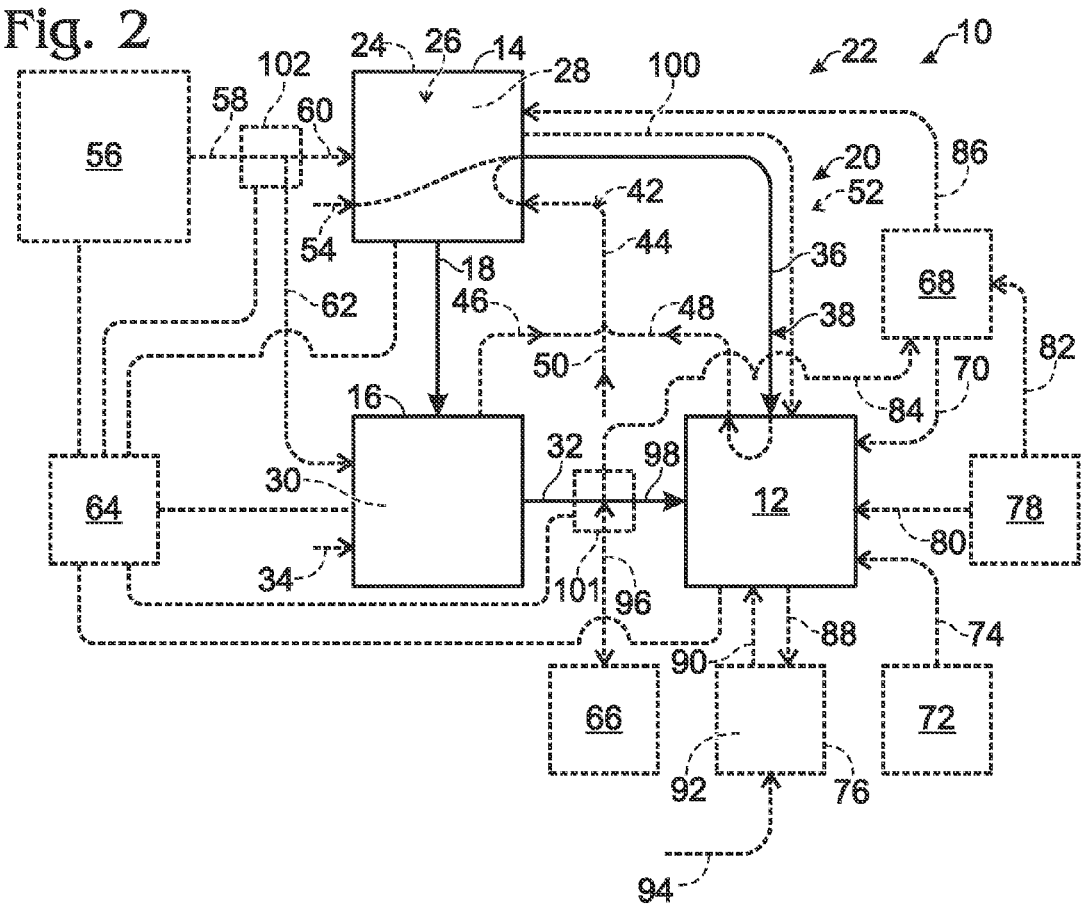
FIG. 2 is a schematic diagram of additional illustrative, non-exclusive examples of fuel cell systems according to the present disclosure, and with which methods according to the present disclosure may be utilized, schematically illustrated together with an energy-consuming device, optional components of fuel cell systems according to the present disclosure, and related components.

Referring now to FIG. 2, additional illustrative, non-exclusive examples of fuel cell systems 10 according to the present disclosure are schematically illustrated, including the schematic illustration of various optional components of fuel cell systems 10 and/or of various associated components, structure, and/or systems. Specifically, as schematically illustrated in FIG. 2, a fuel cell system 10 according to the present disclosure may (but is not required to) include one or more of a controller 64 and one or more batteries 66. Additionally or alternatively, a fuel cell system 10 may include or may be configured to operate in conjunction with an air-conditioning system 68 for cooling, or normally cooling, the one or more energy-consuming devices as schematically illustrated at 70, an auxiliary electrical generator 72 (e.g., a generator including a gasoline or diesel fueled internal combustion engine) configured to alternatively or supplementally provide power to the one or more energy-consuming devices as schematically illustrated at 74, a supplemental cooling assembly 76, and a primary power source 78 configured to normally provide power to the one or more energy-consuming devices, as schematically illustrated at 80. Illustrative, non-exclusive examples of a suitable primary power source include an electrical grid, a solar power source, a wind power source, a hydroelectric power source, etc. Other primary power sources are also within the scope of the present disclosure.

Fuel cell systems 10 according to the present disclosure may (but are not required to) be used as back-up power systems for the one or more energy-consuming devices, for example, when a primary power source 78, such as an electrical grid, is or becomes unavailable to provide power to the one or more energy-consuming devices 12 and/or unavailable to power an associated air conditioning system 68 used for cooling the one or more energy-consuming devices, as optionally and schematically illustrated in FIG. 2. That is, a primary power source 78 may be configured to normally power the one or more energy-consuming devices, as well as to normally power an air conditioning system 68, as schematically illustrated at 82. In such a configuration, the air conditioning system that is powered by the primary power source may be referred to as the primary cooling system, and the heat exchange system associated with the hydrogen storage device may optionally be referred to as a backup, or auxiliary, cooling system.

Additionally or alternatively, as discussed herein, and as schematically illustrated at 84, an air conditioning system 68 may be powered by a fuel cell stack 16 of a fuel cell system 10 according to the present disclosure, for example, when the primary power source becomes unavailable to do so. By "unavailable," it is meant that the primary power source is not able to provide the power, or electrical output, required by the air conditioning and/or other energy-consuming device. As illustrative, non-exclusive examples, a primary power source may be unavailable if it is malfunctioning, shutdown, electrically disconnected from (the air conditioning system), and/or overloaded. Additionally or alternatively, an air conditioning system 68 may be used to selectively cool the hydrogen storage device 14 to at least partially facilitate the exothermic process of sorbing hydrogen gas by hydrogen storage material when a hydride bed is being recharged with hydrogen gas, as schematically illustrated at 86.

As used herein, "air conditioning system" encompasses any suitable cooling device(s) configured to normally cool the one or more energy-consuming devices when a primary power source is available to power the air conditioning system. Illustrative, non-exclusive examples of suitable air conditioning systems that may be used to cool one or more energy-consuming devices include (but are not limited to) systems that operate on a refrigeration cycle, systems that utilize evaporative cooling, etc.

In addition to, or as an alternative to, utilizing an air conditioning system 68 for normal cooling of the one or more energy-consuming devices 12 during periods in which a primary power source 78 is available to power the one or more energy-consuming devices, a supplemental cooling assembly 76 may be provided to cool and/or supplement the cooling of the one or more energy-consuming devices, by absorbing, or drawing, heat therefrom, as schematically indicated at 88 in FIG. 2.

A supplemental cooling assembly 76 may be defined as a component of a heat exchange system 20 according to the present disclosure, and therefore, in some examples, may supplement the cooling of the one or more energy-consuming devices provided by the endothermic process of the selective desorption of hydrogen gas from a hydride bed 26. That is, a supplemental cooling assembly 76 may supplement the cooling of an air conditioning system 68 and/or supplement the cooling effectuated by the hydrogen storage device. In some examples, a cooled fluid stream 90 may be produced for cooling the one or more energy-consuming devices; however, it is within the scope of the present disclosure that the supplemental cooling assembly passively provides cooling to the one or more energy-consuming devices simply by absorbing heat therefrom.

An illustrative, non-exclusive example of a supplemental cooling assembly 76 that may be utilized with fuel cell systems 10 according to the present disclosure includes a volume of phase change material 92 configured to passively cool the one or more energy-consuming devices when the phase change material changes phase. Supplemental cooling assemblies that include a volume of phase change material may also be referred to as latent heat storage units and/or passive cooling systems. Latent heat storage units typically operate by absorbing heat from an environment to be cooled causing the phase change material to change from a solid phase to a liquid phase. Latent heat storage units must therefore be occasionally recharged, or cooled, so that the phase change material changes back to a solid phase from a liquid phase and thus can once again absorb heat from an environment to be cooled, such as associated with the one or more energy-consuming devices. This cooling of the phase change material is schematically represented in FIG. 2 at 94. Such cooling may be provided from any suitable source. For example, the supplemental cooling assembly may be operatively connected to the hydrogen storage device, such that at least a portion of the cooled fluid stream 36 is selectively delivered to the supplemental cooling assembly to cool the volume of phase change material. That is, a control system 22 according to the present disclosure may be configured to selectively deliver at least a portion of the cooled fluid stream 36 to the supplemental cooling assembly to cool the volume of phase change material. Additionally or alternatively, the supplemental cooling assembly may be operatively connected to an air conditioning system 68, when present, and/or be cooled by the air conditioning system simply by its proximity to, or within, an enclosure associated with the one or more energy consuming devices. Other configurations are also within the scope of the present disclosure.

Additionally or alternatively, when present, a supplemental cooling assembly 76 may be operatively connected to the hydrogen storage device, and the heat exchange system 20 may be configured to deliver heat from the supplemental cooling assembly to the hydrogen storage device to desorb hydrogen gas from the hydrogen storage material, such as for delivery to the one or more fuel cell stacks and/or to generate the cooling to provide a cooled fluid stream. For example, and as mentioned, a supplemental cooling assembly that utilizes a volume of phase change material must occasionally be recharged, or cooled. When the volume of phase change material is cooled, heat is drawn away from the phase change material. This heat may be utilized by heat exchange systems 20 according to the present disclosure to heat the hydrogen storage material for desorption of hydrogen gas therefrom.

Additionally or alternatively, heat exchange systems 20 according to the present disclosure may be configured to selectively deliver heat from the one or more fuel cell stacks, when the fuel cell stacks are producing an electrical output. That is, the supplemental cooling assembly may additionally or alternatively absorb heat generated by the production of electricity by the fuel cell stacks. Additionally or alternatively, heat exchange systems according to the present disclosure may include a heating assembly configured to produce a heated fluid stream for delivery to the supplemental cooling assembly to heat the volume of phase change material. Other configurations are also within the scope of the present disclosure.

A fuel cell system 10 utilized as a backup power system may (but is not required to) include one or more batteries 66 that are available to at least temporarily fulfill the electrical demand, or applied load, of the one or more energy-consuming devices 12, for example, during a start-up period of the fuel cell system or during periods in which the fuel cell stack(s) lack the capacity to fulfill the applied load of the one or more energy-consuming devices. Additionally or alternatively, one or more fuel cell stacks 16 may be used to recharge the one or more batteries, for example, during periods in which an electrical output of the fuel cell stacks exceeds an applied load from the one or more energy-consuming devices. Stated differently, a control system 22 of a fuel cell system 10 may be configured so that one or both of a fuel cell stack and a battery provide power to the energy-consuming device in response to a predetermined criterion. Accordingly, FIG. 2 schematically illustrates at 96 and 98 that current may flow from the one or more fuel cell stacks 16 to and from the battery, as well as from the one or more fuel cell stacks and the one or more batteries to the one or more energy-consuming devices, respectively. Other suitable predetermined criteria may be used without departing from the scope of the present disclosure. Examples of backup power systems that utilize fuel cell stacks and batteries are disclosed in U.S. Pat. No. 7,250,231 and U.S. Patent Application Ser. No. 61/186,732, the contents of which are hereby incorporated by reference.

Heat exchange systems 20 according to the present disclosure may be configured to deliver more than one cooled fluid stream, such as schematically illustrated by a second cooled fluid stream 100 in FIG. 2. Such a configuration may be suitable for various reasons. As an illustrative, non-exclusive example, the one or more energy-consuming devices 12 may include energy-consuming devices having different cooling requirements. Other reasons and configurations are also within the scope of the present disclosure and are discussed herein.

FIG. 2 also schematically illustrates an optional controller 64, which when present, may be operatively coupled to one or more of the hydrogen storage device 14, the one or more fuel cell stacks 16, the one or more energy-consuming devices 12, a hydrogen source 56, and/or other various components of, or related to, fuel cell systems 10 according to the present disclosure, such as schematically illustrated by the illustrative, non-exclusive dashed connections in FIG. 2. The optional controller may be, or may be described as, a component of an optional control system 22, and as used herein, "controller" refers to any suitable mechanism for actively controlling operation of, or aspects of, a fuel cell system 10. For example, as an illustrative, non-exclusive example, a controller 64 may include a computer with software for controlling operation of, or aspects of, a fuel cell system 10. As a further illustrated, non-exclusive example, such a computer may include storage media having executable instructions adapted to control the operation of, or aspects of, a fuel cell system 10.

As discussed herein, fuel cell stack 16 may be used to provide an electrical output to one or more of energy-consuming device(s) 12, optional air conditioning system 68, and/or optional one or more batteries 66. Accordingly, a control system 22 according to the present disclosure may include an electrical regulator, or manifold, 101, or other structure configured to selectively deliver (and/or permit delivery, or flow, of) electric current to the energy consuming device(s), the optional air conditioning system, and/or the optional one or more batteries, such as may be determined by various criteria as discussed herein, and as schematically illustrated in FIG. 2. When present, and as schematically illustrated in FIG. 2, the electrical regulator may be operatively coupled to and/or controlled by the optional controller 64.

As mentioned, fuel cell systems 10 according to the present disclosure may include a hydrogen source 56, which, when present, may be configured to supply, or selectively supply, hydrogen gas to one or both, of the hydrogen storage device 14 and the one or more fuel cell stacks 16. Although not required, fuel cell system 10, and optional control system 22 thereof, may include a fluid regulator, or manifold, 102, or other structure configured to selectively deliver (and/or permit delivery, or flow, of) hydrogen gas to one or both of the hydrogen storage device and the one or more fuel cell stacks, such as may be determined by various criteria as discussed herein, and as schematically illustrated in FIG. 2. When present, and as schematically illustrated in FIG. 2, the fluid regulator may be operatively coupled to and/or controlled by the optional controller 64.

An illustrative, non-exclusive example of a suitable hydrogen source 56 that may be used with and/or implemented with fuel cell systems 10 according to the present disclosure includes a fuel processing assembly 104 that includes a fuel processor 106 configured to generate hydrogen gas from a carbon-containing feedstock and/or water, and which is schematically illustrated in FIG. 3. Fuel processors 106 also may be referred to as hydrogen-producing fuel processors, hydrogen-producing assemblies, or hydrogen-generating assemblies. When present, fuel processor 106 is configured to produce hydrogen stream 58, which, in some examples, may be substantially pure hydrogen gas, from one or more feed streams 108. The one or more feed streams 108 are delivered to the fuel processor by one or more feedstock delivery systems 110. A feed stream includes at least one carbon-containing feedstock 112 and also may include water 114. Illustrative, non-exclusive examples of suitable carbon-containing feedstocks 112 include at least one hydrocarbon and alcohol. Illustrative, non-exclusive examples of suitable hydrocarbons include diesel, kerosene, gasoline, methane, natural gas, and the like. Illustrative, non-exclusive examples of suitable alcohols include methanol, ethanol, and polyols, such as ethylene glycol and propylene glycol.

Fuel processor 106 includes any suitable device, or combination of devices, adapted to produce via chemical reaction predominately hydrogen gas from one or more feed streams 108. Accordingly, fuel processor 106 includes a hydrogen-producing region 116, in which an output stream 118 containing hydrogen gas is produced by utilizing any suitable hydrogen-producing mechanism(s). Output stream 118 includes hydrogen gas as at least a majority component. Output stream 118 may include one or more additional gaseous components, and accordingly may be referred to as a mixed gas stream, which contains hydrogen gas as its majority component, and which also contains other gases as minority components. Illustrative, non-exclusive examples of suitable mechanisms for producing hydrogen gas include (but are not limited to) steam reforming and autothermal reforming. Other suitable mechanisms include pyrolysis and catalytic partial oxidation of a carbon-containing feedstock, in which cases the feed stream does not contain water. Still another suitable mechanism for producing hydrogen gas is electrolysis, in which case the feedstock is water. It is within the scope of the present disclosure that the fuel processor may be adapted to produce hydrogen gas by utilizing more than a single mechanism.

In the illustrative, non-exclusive example of steam reforming, a reforming catalyst is used to produce hydrogen gas from at least one feed stream 108 containing a carbon-containing feedstock 112 and water 114. In a steam reforming process, hydrogen-producing region 116 contains a suitable steam reforming catalyst 120. In such an example, the fuel processor may be referred to as a steam reformer, hydrogen-producing region 116 may be referred to as a reforming region, and output, or mixed gas, stream 118 may be referred to as a reformate stream, and/or as a reformate mixed-gas stream. As used herein, a reforming region includes any hydrogen-producing region utilizing a steam reforming hydrogen-producing mechanism. Illustrative, non-exclusive examples of suitable catalysts for catalyzing the production of hydrogen gas from methanol and water via a steam reforming reaction are disclosed in U.S. Patent Application Publication No. 2006/0236607A1, the complete disclosure of which is hereby incorporated by reference. The other gases that may be present in the reformate stream include carbon monoxide, carbon dioxide, methane, steam, and/or unreacted carbon-containing feedstock.

At least hydrogen-producing region 116 of fuel-processing assembly 106 is designed to be operated at an elevated temperature when being utilized to produce hydrogen gas for output stream 118. This hydrogen-producing temperature may be achieved and/or maintained in hydrogen-producing region 116 through the use of a heating assembly 122, or other heat source. Hydrogen-producing steam reformers typically operate at temperatures in the range of 200-900° C. Temperatures outside of this range are within the scope of the present disclosure. When the carbon-containing feedstock is methanol, the steam reforming reaction will typically operate in a temperature range of approximately 200-500° C. Illustrative subsets of this range include 350-450° C., 375-425° C., 375-400° C., and 400-450° C. When the carbon-containing feedstock is a hydrocarbon, ethanol, or another alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C.

In some fuel processing assemblies according to the present disclosure, heating assembly 122 includes a burner assembly 124 and may be referred to as a combustion-based, or combustion-driven, heating assembly. In a combustion-based heating assembly 122, the heating assembly is adapted to receive at least one fuel stream 126 and to combust the fuel stream in the presence of air to provide a hot combustion stream 128 that may be used to heat at least the hydrogen-producing region 116 of the fuel processor. Combustion stream 128 also may be referred to as a heated exhaust stream. Air may be delivered to the heating assembly via an air stream 130; however, it is within the scope of the disclosure for the air stream to additionally or alternatively be delivered to the heating assembly with fuel stream 126 and/or drawn from the environment within which the heating assembly is utilized.

It is within the scope of the present disclosure that combustion stream 128 may additionally or alternatively be used to heat other portions of the fuel processor and/or the fuel cell system 10 with which heating assembly 122 is used. For example, and as mentioned, heating assembly 122 may be used to heat one or more of a hydrogen storage device 14 and a supplemental cooling assembly 76, and therefore may (but is not required to) be a heating assembly 40 according to the present disclosure. In FIG. 3, a supplemental combustion stream 131 is schematically illustrated to represent that the combustion stream 128, a portion of the combustion stream 128, and/or a separate combustion stream may additionally or alternatively be formed from the heating assembly 122 and used to heat other portions of a fuel cell system 10 according to the present disclosure. It is also within the scope of the present disclosure that other configurations and types of heating assemblies 122 may be utilized. As an illustrative example, a heating assembly 122 may be an electrically powered heating assembly that is adapted to heat at least the hydrogen-producing region of the fuel processor by generating heat using at least one heating element, such as a resistive heating element. Therefore, it is not required in all embodiments that heating assembly 122 receive and combust a combustible fuel stream to heat hydrogen-producing region 116 to a suitable hydrogen-producing temperature. Illustrative, non-exclusive examples of suitable heating assemblies that may be used with fuel processing assemblies according to the present disclosure are disclosed in U.S. Patent Application Publication Nos. 2003/0192251, 2003/0223926, and 2006/0272212, the complete disclosures of which are hereby incorporated by reference.

As indicated in dashed lines in FIG. 3, fuel processors 106 and/or fuel-processing assemblies 104 according to the present disclosure may include a vaporization region 132 that is adapted to receive a liquid feed stream 108 (or a liquid component of a feed stream 108, such as a stream of water 114 and/or a stream of a liquid carbon-containing feedstock 112) and to vaporize the feed stream (or portion thereof) prior to delivery to hydrogen-producing region 116 of fuel processor 106. As indicated schematically in FIG. 3 in dashed lines, heated combustion stream 128 from the heating assembly may be used to vaporize the feed stream in vaporization region 132 and/or otherwise heat the feed stream. It is within the scope of the disclosure that fuel processor 106 may be constructed without a vaporization region and/or that the fuel processor may be adapted to receive a feed stream that is gaseous or that has already been vaporized.

In many applications, it may be desirable for fuel processor 106 and/or fuel-processing assembly 104 to produce a hydrogen stream 58 containing at least substantially pure hydrogen gas. Accordingly, the fuel processor may utilize a process that inherently produces sufficiently pure hydrogen gas. When the output stream contains sufficiently pure hydrogen gas and/or sufficiently low concentrations of one or more non-hydrogen components for a particular application, hydrogen stream 58 may be formed directly from output stream 118. However, in many hydrogen-producing processes, output stream 118 will be a mixed gas stream that contains hydrogen gas as a majority component along with other gases. Similarly, the output stream 118 may be substantially pure hydrogen but still contain concentrations of one or more non-hydrogen components that are harmful or otherwise undesirable in the downstream components of a fuel cell system 10. For the purposes of the present disclosure, substantially pure hydrogen gas is greater than 90% pure, and may be greater than 95% pure, greater than 99% pure, or even greater than 99.5% pure. Illustrative, non-exclusive examples of suitable fuel processors are disclosed in U.S. Pat. Nos. 6,221,117, 5,997,594, 5,861,137, and pending U.S. Patent Application Publication Nos. 2001/0045061, 2003/0192251, and 2003/0223926, the complete disclosures of which are hereby incorporated by reference. Unless otherwise specified herein, compositional percentages refer to volume percentages, which may be designated as vol %.

Accordingly, fuel-processing assembly 104 may (but is not required to) further include a purification region 134, in which a hydrogen-rich stream 136 is produced from the output, or mixed gas, stream. Hydrogen-rich stream 136 contains at least one of a greater hydrogen concentration than output stream 118 and a reduced concentration of one or more of the other gases or impurities that were present in the output stream. Purification region 134 is schematically illustrated in FIG. 3, where output stream 118 is shown being delivered to an optional purification region 134. As shown in FIG. 3, at least a portion of hydrogen-rich stream 136 forms hydrogen stream 58. Accordingly, hydrogen-rich stream 136 and hydrogen stream 58 may be the same stream and have the same compositions and flow rates. However, it is also within the scope of the present disclosure that some of the purified hydrogen gas in hydrogen-rich stream 136 may be stored for later use, such as in a suitable hydrogen storage assembly, subjected to a further purification process, and/or consumed by the fuel-processing assembly (such as for use as a fuel stream for a heating assembly).

Illustrative, non-exclusive examples of optional purification region 134 include (but are not limited to) at least one hydrogen selective membrane 138, a pressure swing adsorption (PSA) assembly 140, and a chemical carbon monoxide removal assembly 142 (such as including at least one methanation catalyst bed). Illustrative, non-exclusive examples of such optional purification regions are disclosed in U.S. Patent Application Publication No. 2008/0299429, the complete disclosure of which is hereby incorporated by reference.

Illustrative, non-exclusive examples of suitable fuel processors 106 and fuel processing assemblies 104 that may be used and/or implemented with fuel cell systems 10 according to the present disclosure are disclosed in U.S. patent application Ser. No. 12/182,959, U.S. Patent Application Publication No. 2007/0065689, PCT Patent Application Publication No. WO 03/086964, and U.S. Pat. Nos. 6,723,156 and 6,537,352, the complete disclosures of which are hereby incorporated by reference.

Turning now to FIG. 4, illustrative, non-exclusive examples of hydrogen storage devices 14 that include more than one hydride bed are schematically illustrated. Such a hydrogen storage device may be configured for a variety of suitable reasons. For example, a hydrogen storage device having multiple (i.e., two or more) hydride beds may be configured to optimize, or at least improve, the heat transfer via the heat exchange system 20, for example, to efficiently deliver heat to the hydride beds and efficiently desorb hydrogen gas therefrom. Additionally or alternatively, multiple hydride beds may be provided to enable selective control of the rate of hydrogen gas being desorbed and delivered to the one or more fuel cell stacks. For example, if a demand, or electrical load, of the one or more energy-consuming device is relatively low, and thus the hydrogen demand of the one or more fuel cell stacks is correspondingly low, a hydrogen storage device and control system of a fuel cell system 10 may be configured to desorb hydrogen gas from only one or more of a plurality of hydride beds.

Accordingly, as schematically illustrated in FIG. 4, a hydrogen storage device with more than one hydride bed may include a first hydride bed 150 having a first volume 152 of hydrogen storage material 28 adapted to produce a first cooled fluid stream 154 and selectively desorb hydrogen gas to produce a first hydrogen delivery stream 156, and a second hydride bed 158 having a second volume 160 of hydrogen storage material 28 adapted to produce a second cooled fluid stream 162 and selectively desorb hydrogen gas to produce a second hydrogen delivery stream 164. Hydrogen delivery streams 156 and 164 may individually or collectively form a hydrogen gas stream 19. FIG. 4 also schematically illustrates a first heated stream 166 and a second heated stream 168, separately delivering heat to the first and second hydride beds, respectively. In such configurations, the heated streams and the cooled fluid streams may define separate closed loop heat exchange systems with the one or more energy-consuming devices, for example, for controlled cooling of separate energy-consuming devices. Additionally or alternatively, the heat streams and the cooled fluid streams may collectively define a single closed loop heat exchange system with the one or more energy-consuming devices. Additionally or alternatively, a single heat stream, or heat source, may provide the necessary heat to heat both the first and second hydride beds for the selective desorption of hydrogen gas therefrom.

Additionally or alternatively, the hydrogen storage material of the first hydride bed may have a different composition than the hydrogen storage material of the second hydride bed, and therefore may result in a cooler or warmer first cooled fluid stream 154 relative to the second cooled fluid stream 162. Accordingly, as mentioned, a hydrogen storage device may be utilized for controlled cooling of separate energy-consuming devices having distinct cooling requirements.

Additionally or alternatively, hydrogen storage devices 14 that include more than one hydride bed, and/or a control system according to the present disclosure, may be configured so that when the hydrogen storage material 152 of the first hydride bed 150 sorbs hydrogen gas from a hydrogen source, the hydrogen storage material 160 of the second hydride bed 158 desorbs hydrogen gas for delivery to the one or more fuel cell stacks. Conversely, when the hydrogen storage material 160 of the second hydride bed 158 sorbs hydrogen gas from a hydrogen source, the hydrogen storage material 152 of the first hydride bed 150 desorbs hydrogen gas for delivery to the fuel cell stack. With such a configuration, the hydrogen storage device may utilize the exchange of heat between the first and second hydride beds for endothermic and exothermic processes of desorbing and sorbing hydrogen gas, respectively, as schematically represented by the arrow 170 in FIG. 4. Stated differently, a hydrogen storage device and/or a control system according to the present disclosure may be configured so that when the hydrogen storage material of the first hydride bed sorbs hydrogen gas, the hydrogen storage material of the second hydride bed desorbs hydrogen gas, and the heat produced from sorbing hydrogen gas by the hydrogen storage material of the first hydride bed contributes at least in part to the desorbing of hydrogen gas from the hydrogen storage material of the second hydride bed.

FIG. 4 also schematically illustrates optional hydrogen streams 58 being delivered to the hydride beds, for example from a hydrogen source according to the present disclosure.

An illustrative, non-exclusive example of a hydrogen storage device 14, or at least a portion thereof, according to the present disclosure that includes more than one hydride bed is illustrated in FIG. 5 and is generally indicated at 200. Specifically, the illustrated hydrogen storage device 200 includes six individual cylindrical vessels 24, each vessel having a hydride bed 26 therein that contains hydrogen storage material. Each of the six vessels 24 is disposed within an air stream conduit 202. For purposes of illustration, an optional outer wall of one of the six air stream conduits 202 is not illustrated in order to reveal the corresponding vessel 24 positioned therein.

The illustrated hydrogen storage device 200 of FIG. 5 also includes six fans 206 positioned at a first end 208 of the air stream conduits 202 and configured to draw air, such as in the form of a heated air stream 44, into and through the air stream conduits. As the air passes over the vessels 24, heat is transferred from the air stream, through the vessels, and into the hydride beds. A cooled air stream 36 exits the hydrogen storage device 200 at a second end 210 for delivery to the one or more energy-consuming devices.

To facilitate the heat transfer from the heated air stream to the hydrogen storage material, the vessels 24 may include heat transfer structure, such as fins on one or both of the outside and inside of the vessels. For example, as illustrated in the detail view of FIG. 6, the illustrative, non-exclusive example of hydrogen storage device 200 includes fins 212 extending longitudinally along the length of the vessels 24 and defining the outside surface thereof. In such embodiments, vessels 24 may be easily extruded, for example, of aluminum or other suitable heat conductive material.

Additionally or alternatively, the inside of vessels 24 may include similar such heat transfer structure. For example, extruded longitudinal fins may extend into and between the hydrogen storage material 28 of the respective hydride beds 26. Additionally or alternatively, a plurality of pin-like, or brush-like, heat transfer structures may extend from the inside surface of the vessels and through the hydrogen storage material to efficiently transfer heat from the air stream, through the wall of the vessel, and to the hydrogen storage material for desorption of hydrogen gas therefrom.

As discussed, fuel cell systems 10 and control systems 22 according to the present disclosure may include various conduits and manifolds to facilitate the delivery of various streams to and from the hydrogen storage device 14. Accordingly, hydrogen storage device 200 may be functionally coupled to a manifold at its second end 210, with the manifold fluidly combining the outlet streams of the air stream conduits 202 into a single cooled air stream 36. The same manifold or an additional manifold may also be provided at the second end 210 of the hydrogen storage device 200 for the selective delivery of hydrogen gas to and from the vessels 24.

The example of hydrogen storage device 200 of FIG. 5 is provided for the purpose of illustration, and not limitation, and any suitable configuration of hydrogen storage devices may be used and are within the scope of the present disclosure. For example, as illustrative, non-exclusive examples, any number (including greater or fewer numbers than those shown in the illustrative example) and any operatively suitable configuration of hydride beds 26, vessels 24, conduits 202, fans 206 for each conduit and/or vessel, manifolds, control systems, etc. may be embodied in or associated with hydrogen storage devices and are within the scope of the present disclosure.

As expressed herein, the present disclosure is also directed to methods of providing power and cooling to an energy-consuming device with a fuel cell system containing a hydrogen storage device. Methods according to the present disclosure may be described in terms of one or more functions of one or more components of fuel cell systems 10 according to the present disclosure. That is, a method according to the present disclosure may be described in terms of steps carried out by, performed by, controlled by, and/or implemented by such illustrative, non-exclusive examples of fuel cell systems and related components as energy-consuming device 12, hydrogen storage device 14, fuel cell stack 16, hydrogen delivery conduit 18, heat exchange system 20, control system 22, hydrogen source 56, controller 64, battery 66, air-conditioning system 68, auxiliary electrical generator 72, supplemental cooling assembly 76, and primary power source 78.

As an illustrative, non-exclusive example, a method according to the present disclosure includes desorbing hydrogen gas from a volume of hydrogen storage material, utilizing the endothermic process of the desorbing to cool an energy-consuming device, delivering the desorbed hydrogen gas to a fuel cell stack, and producing, by the fuel cell stack, an electrical output from the desorbed hydrogen gas and an oxidant, and powering the energy-consuming device with the electrical output from the fuel cell stack.

In some methods according to the present disclosure, the desorbing of the hydrogen gas may be accomplished by, performed by, or include delivering a heated fluid stream from the energy-consuming device to the hydrogen storage device. In some methods according to the present disclosure, utilizing the endothermic process of the desorbing of hydrogen gas may include delivering a cooled fluid stream from the hydrogen storage device to the energy-consuming device. Some methods according to the present disclosure may include circulating a fluid stream between the hydrogen storage device and the energy-consuming device with such a fluid stream comprised of the heated fluid stream from the energy-consuming device and the cooled fluid stream from the hydrogen storage device.

As mentioned, fuel cell systems according to the present disclosure may be used as backup power systems and/or backup cooling systems for an energy-consuming device. Accordingly, an illustrative, non-exclusive example of a method according to the present disclosure may include detecting at least one of unavailability of a primary power source normally configured to power the energy-consuming device and an applied load to the fuel cell system from the energy-consuming device. Additionally or alternatively, a method according to the present disclosure may include monitoring a status of a primary power source and/or a status of an energy-consuming device. Additionally or alternatively, a method according to the present disclosure may include monitoring the temperature of an energy-consuming device and providing cooling to the energy-consuming device when its temperature exceeds a predetermined threshold.

Some methods according to the present disclosure may include generating, by a fuel processor, hydrogen gas from a feed stream containing at least a carbon-containing feedstock, and delivering at least a portion of the hydrogen gas generated by the fuel processor to at least one of a hydrogen storage device for sorption by a hydrogen storage material and a fuel cell stack for production of an electrical output.

Other examples of methods are within the scope of the present disclosure, and as mentioned, methods according to the present disclosure may be described in terms of one or more functions of the one or more components of fuel cell systems 10 and related components described herein.

The following enumerated paragraphs represent illustrative, non-exclusive ways of describing inventions according to the present disclosure.

A A fuel cell system for providing power and cooling to an energy-consuming device, the fuel cell system comprising:
a fuel cell stack configured to produce an electrical output from hydrogen gas and an oxidant;
a hydrogen storage device including a hydride bed having a volume of hydrogen storage material, the hydrogen storage material configured to selectively sorb hydrogen gas for storage in the hydrogen storage device and to selectively desorb hydrogen gas for delivery to the fuel cell stack;
a hydrogen delivery conduit fluidly connecting the hydride bed to the fuel cell stack for delivering desorbed hydrogen gas to the fuel cell stack to produce the electrical output;
a heat exchange system operatively connected to the hydrogen storage device and configured to heat the hydrogen storage material to desorb hydrogen gas for delivery to the fuel cell stack, the heat exchange system further configured to produce a cooled fluid stream from the endothermic process associated with heating the hydrogen storage material and desorbing hydrogen gas from the hydrogen storage material, wherein the heat exchange system includes a cooling conduit for delivering the cooled fluid stream to the energy-consuming device; and
a control system configured to control, during operation of the fuel cell system, one or more of sorption of hydrogen gas by the hydrogen storage material, desorption of hydrogen gas from the hydrogen storage material, delivery of hydrogen gas to the fuel cell stack, heating of the hydrogen storage material, and delivery of the cooled fluid stream to the energy-consuming device.

A1 The fuel cell system of paragraph A, wherein the heat exchange system further includes a heat delivery conduit for delivering a heated fluid stream heated by the energy-consuming device to the hydrogen storage device for heating the hydrogen storage material to desorb hydrogen gas for delivery to the fuel cell stack.

A1.1 The fuel cell system of paragraph A1, wherein the cooled fluid stream and the heated fluid stream form a closed loop heat exchange system between the hydrogen storage device and the energy-consuming device.

A2 The fuel cell system of any of paragraphs A-A1.1, wherein the control system is configured so that when the fuel cell stack is producing the electrical output, the fuel cell stack is producing a heated fluid stream that is delivered to the hydrogen storage device for heating the hydrogen storage material to desorb hydrogen gas for delivery to the fuel cell stack.

A3 The fuel cell system of any of paragraphs A-A2, wherein the heat exchange system includes a heating assembly configured to heat the hydrogen storage material to desorb hydrogen gas for delivery to the fuel cell stack.

A3.1 The fuel cell system of paragraph A3, wherein the heating assembly includes an electric resistance heater.

A4 The fuel cell system of any of paragraphs A-A3.1, wherein the heat exchange system is configured to draw a heated fluid stream from an ambient environment adjacent the fuel cell system for delivery to the hydrogen storage device to desorb hydrogen gas from the hydrogen storage material for delivery to the fuel cell stack.

A5 The fuel cell system of any of paragraphs A-A4, wherein the cooled fluid stream is a cooled air stream.

A6 The fuel cell system of any of paragraphs A-A4, wherein the heat exchange system is configured to deliver a heated air stream to the hydrogen storage device to heat the hydrogen storage material to desorb hydrogen gas for delivery to the fuel cell stack.

A6.1 The fuel cell system of paragraph A6, wherein the cooled fluid stream is a cooled air stream.

A6.1.1 The fuel cell system of paragraph A6.1, wherein the cooled air stream and the heated air stream form a closed loop heat exchange system between the hydrogen storage device and the energy-consuming device.

A7 The fuel cell system of any of paragraphs A-A4, wherein the cooled fluid stream is a cooled liquid stream.

A8 The fuel cell system of any of paragraphs A-A4, wherein the heat exchange system is configured to deliver a heated liquid stream to the hydrogen storage device to heat the hydrogen storage material to desorb hydrogen gas for delivery to the fuel cell stack.

A8.1 The fuel cell system of paragraph A8, wherein the cooled fluid stream is a cooled liquid stream.

A8.1.1 The fuel cell system of paragraph A8.1, wherein the cooled liquid stream and the heated liquid stream form a closed loop heat exchange system between the hydrogen storage device and the energy-consuming device.

A9 The fuel cell system of any of paragraphs A-A8.1.1, wherein the hydride bed is a first hydride bed, the hydrogen storage material is a first hydrogen storage material, and the hydrogen delivery conduit is a first hydrogen delivery conduit;
wherein the hydrogen storage device further includes a second hydride bed separate from the first hydride bed, the second hydride bed having a volume of a second hydrogen storage material; and
wherein the fuel cell system further comprises:
a first hydrogen supply conduit fluidly connected to the first hydride bed for delivering hydrogen gas to the first hydride bed from a hydrogen source for sorption by the first hydrogen storage material;
a second hydrogen supply conduit fluidly connected to the second hydride bed for delivering hydrogen gas to the second hydride bed from the hydrogen source for sorption by the second hydrogen storage material; and
a second hydrogen delivery conduit fluidly connecting the second hydride bed to the fuel cell stack for delivering desorbed hydrogen gas to the fuel cell stack.

A9.1 The fuel cell system of paragraph A9, wherein the first hydrogen storage material has a different composition than the second hydrogen storage material.

A9.2 The fuel cell system of paragraph A9, wherein the first hydrogen storage material has the same composition as the second hydrogen storage material.

A9.3 The fuel cell system of paragraph A9, wherein the control system is configured so that when the first hydrogen storage material sorbs hydrogen gas from the hydrogen source, the second hydrogen storage material desorbs hydrogen gas for delivery to the fuel cell stack, and the control system is further configured so that when the second hydrogen storage material sorbs hydrogen gas from the hydrogen source, the first hydrogen storage material desorbs hydrogen gas for delivery to the fuel cell stack.

A9.3.1 The fuel cell system of paragraph A9.3, wherein the control system is configured so that when the first hydrogen storage material sorbs hydrogen gas, the second hydrogen storage material desorbs hydrogen gas, and the heat produced from sorbing hydrogen gas by the first hydrogen storage material contributes at least in part to the desorbing hydrogen gas from the second hydrogen storage material.

A10 The fuel cell system of any of paragraphs A-A8.1.1, wherein the hydride bed is a first hydride bed, the cooling conduit is a first cooling conduit, the cooled fluid stream is a first cooled fluid stream, and the energy-consuming device is a first energy-consuming device;

wherein the hydrogen storage device further includes a second hydride bed separate from the first hydride bed; and wherein the heat exchange system further includes a second cooling conduit for delivering a second cooled fluid stream to a second energy-consuming device.

A11 The fuel cell system of any of paragraphs A-A10, wherein the energy-consuming device includes telecommunications equipment.

A12 The fuel cell system of any of paragraphs A-A11, wherein the energy-consuming device includes electronics.

A13 The fuel cell system of any of paragraphs A-A12, wherein the energy-consuming device is housed in an enclosure.

A14 The fuel cell system of any of paragraphs A-A13, wherein the heat exchange system further includes a supplemental cooling assembly including a volume of phase change material and configured to draw heat from the energy-consuming device when the phase change material changes phase.

A14.1 The fuel cell system of paragraph A14,
wherein the supplemental cooling assembly is operatively connected to the hydrogen storage device; and
wherein the control system is configured to selectively deliver at least a portion of the cooled fluid stream to the supplemental cooling assembly to cool the volume of phase change material.

A14.2 The fuel cell system of any of paragraphs A14-A14.1,
wherein the supplemental cooling assembly is operatively connected to the hydrogen storage device; and
wherein the heat exchange system is further configured to deliver heat from the supplemental cooling assembly to the hydrogen storage device to desorb hydrogen gas from the hydrogen storage material for delivery to the fuel cell stack.

A14.3 The fuel cell system of any of paragraphs A14-A14.2, wherein the heat exchange system is further configured to selectively deliver heat from the energy-consuming device to the supplemental cooling assembly to heat the volume of phase change material.

A14.4 The fuel cell system of any of paragraphs A14-A14.3, wherein the heat exchange system is further configured to selectively deliver heat when the fuel cell stack is producing electrical output from the fuel cell stack to the supplemental cooling assembly to heat the volume of phase change material.

A14.5 The fuel cell system of any of paragraphs A14-A14.4, wherein the heat exchange system includes a heating assembly configured to produce a heated fluid stream for delivery to the supplemental cooling assembly to heat the volume of phase change material.

A15 The fuel cell system of any of paragraphs A-A14.5, further comprising:
a fuel processor configured to generate hydrogen gas from a feed stream containing at least a carbon-containing feedstock, the fuel processor operatively coupled to at least one of the hydrogen storage device and the fuel cell stack, the fuel processor configured to selectively deliver at least a portion of the hydrogen gas generated by the fuel processor to at least one of the hydrogen storage device and the fuel cell stack.

A15.1 The fuel cell system of paragraph A15, wherein the fuel processor is configured to deliver hydrogen gas to the fuel cell stack.

A15.1.1 The fuel cell system of paragraph A15.1, wherein the control system is configured to selectively deliver hydrogen gas to the fuel cell stack from one of the hydrogen storage device and the fuel processor in response to a predetermined criterion.

A15.1.1.1 The fuel cell system of paragraph A15.1.1, wherein the predetermined criterion includes one of a load applied by the energy-consuming device, a capacity of the fuel cell stack, a capacity of the hydrogen storage device, and a capacity of the fuel processor.

A15.1.2 The fuel cell system of paragraph A15.1, wherein the control system is configured to selectively deliver hydrogen gas from the fuel processor to the fuel cell stack in response to the hydrogen storage device containing insufficient hydrogen gas to satisfy a hydrogen demand of the fuel cell stack to satisfy a load applied by the energy-consuming device.

A15.1.3 The fuel cell system of paragraph A15.1, wherein the control system is configured to selectively deliver hydrogen gas from the fuel processor to the hydrogen storage device when an amount of hydrogen gas sorbed by the hydrogen storage material falls below a predetermined threshold.

A15.1.4 The fuel cell system of paragraph A15.1, wherein the control system is configured to selectively deliver hydrogen gas from the fuel processor to the fuel cell stack when an amount of hydrogen gas sorbed by the hydrogen storage material falls below a predetermined threshold.

A16 The fuel cell system of any of claims A-A15.1.4, further comprising a battery;
wherein the control system is configured so that one or both of the fuel cell stack and the battery provide power to the energy-consuming device in response to a predetermined criterion.

A17 The fuel cell system of any of paragraphs A-A16,
wherein the cooled fluid stream is a first cooled fluid stream; and
wherein the heat exchange system further includes an air conditioning system configured to produce a second cooled fluid stream for selective delivery to the hydrogen storage device to cool the hydrogen storage material to sorb hydrogen gas from a hydrogen source.

A18 The fuel cell system of any of paragraphs A-A16,
wherein the cooled fluid stream is a first cooled fluid stream; and
wherein the heat exchange system is further configured to draw a second cooled fluid stream from an ambient environment adjacent the fuel cell system for selective delivery to the hydrogen storage device to cool the hydrogen storage material to sorb hydrogen gas from a hydrogen source.

A19 The fuel cell system of any of paragraphs A-A18, wherein the control system is configured so that the fuel cell system provides backup power to the energy-consuming device in response to a primary power source becoming unavailable.

B A method of providing power and cooling to an energy-consuming device with a fuel cell system containing a hydrogen storage device, the method comprising:
desorbing hydrogen gas from a volume of hydrogen storage material of a hydride bed of a hydrogen storage device;
utilizing the endothermic process of the desorbing hydrogen gas from the volume of hydrogen storage material to cool the energy-consuming device;
delivering desorbed hydrogen gas from the hydrogen storage device to a fuel cell stack;
producing, by the fuel cell stack, an electrical output from the desorbed hydrogen gas and an oxidant; and powering the energy-consuming device with the electrical output from the fuel cell stack.

B1 The method of paragraph B, further comprising:
prior to the producing the electrical output, detecting at least one of unavailability of a primary power source normally configured to power the energy-consuming device and an applied load to the fuel cell system from the energy-consuming device.

B1.1 The method of paragraph B, further comprising:
after the detecting and prior to the powering the energy-consuming device with the electrical output from the fuel cell stack, powering the energy-consuming device with a battery.

B1.1.1 The method of paragraph B1.1, wherein the powering the energy-consuming device with a battery includes powering the energy-consuming device with the battery for a period of time until the fuel cell stack produces an electrical output sufficient to power the energy-consuming device.

B1.2 The method of any of paragraphs B1-B1.1.1, wherein desorbing hydrogen gas includes desorbing hydrogen gas from the hydride bed for up to a finite period of time, and wherein the method further comprises:
after desorbing hydrogen gas from the hydrogen bed for up to the finite period of time, powering an air-conditioning system with the electrical output from the fuel cell stack and cooling the energy-consuming device with the air conditioning system.

B1.3 The method of any of paragraphs B1-B1.2, further comprising:
initiating production of hydrogen gas by a fuel processor responsive to detecting unavailability of a primary power source, wherein initiating occurs for a fuel processor start-up period of time;
generating, by the fuel processor, hydrogen gas from a feed stream containing at least a carbon-containing feedstock; and
after the fuel processor start-up period of time, delivering hydrogen gas from the fuel processor to the fuel cell stack for producing the electrical output.

B1.3.1 The method of paragraph B1.3, further comprising:
after the delivering desorbed hydrogen gas from the hydrogen storage device to the fuel cell stack, delivering hydrogen gas from the fuel processor to the hydrogen storage device and sorbing, by the hydrogen storage material, hydrogen gas delivered from the fuel processor.

B2 The method of any of paragraphs B-B1.3.1, wherein the desorbing hydrogen gas includes heating the hydrogen storage material.

B2.1 The method of paragraph B2, wherein the heating includes delivering heat from the energy-consuming device to the hydrogen storage material.

B2.2 The method of any of paragraphs B2-B2.1, wherein the heating includes delivering heat generated by the fuel cell stack to the hydrogen storage material.

B2.3 The method of any of paragraphs B2-B2.2, wherein the heating includes delivering heat from a heating assembly to the hydride bed.

B2.3.1 The method of paragraph B2.3, wherein the heating assembly includes an electric resistance heater.

B2.4 The method of any of paragraphs B2-B2.3.1, wherein the heating includes drawing heat from an ambient environment to heat the hydrogen storage material.

B3 The method of any of paragraphs B-B2.4,
wherein the desorbing hydrogen gas includes delivering a heated fluid stream heated by the energy-consuming device to the hydrogen storage device to heat the hydrogen storage material; and
wherein the utilizing the endothermic process includes delivering a cooled fluid stream from the hydrogen storage device to the energy-consuming device;
wherein the heated fluid stream and the cooled fluid stream form a closed loop heat exchange system between the hydrogen storage device and the energy-consuming device.

B3.1 The method of paragraph B3, wherein the heated fluid stream is a heated air stream.

B3.2 The method of paragraph B3, wherein the heated fluid stream is a heated liquid stream.

B4 The method of any of paragraphs B-B3.2, further comprising:
prior to the desorbing hydrogen gas, sorbing, by the hydrogen storage material, a volume of hydrogen gas.

B4.1 The method of paragraph B4, further comprising:
generating, by a fuel processor, hydrogen from a feed stream containing at least a carbon-containing feedstock; and
delivering hydrogen gas generated by the fuel processor to the hydrogen storage device for sorption by the hydrogen storage material.

B4.1.1 The method of paragraph B4.1, further comprising:
delivering hydrogen gas generated by the fuel processor to the fuel cell stack while delivering hydrogen gas generated by the fuel processor to the hydrogen storage device for sorption by the hydrogen storage material.

B4.1.1.1 The method of paragraph B4.1.1, wherein the generating hydrogen gas includes generating more hydrogen gas than needed by the fuel cell stack to satisfy an applied load from the energy-consuming device.

B5 The method of any of paragraphs B-B4.1.1.1, wherein the energy-consuming device includes telecommunications equipment.

B6 The method of any of paragraphs B-B5, wherein the energy-consuming device includes electronics.

B7 The method of any of paragraphs B-B6, wherein the energy-consuming device is housed in an enclosure.

B7.1 The method of paragraph B7, wherein the utilizing the endothermic process of the desorbing hydrogen gas includes delivering a cooled air stream from the hydrogen storage device to the enclosure.

B8 The method of any of paragraphs B-B7.1, further comprising:
using a supplemental cooling assembly to cool the energy-consuming device, wherein the supplemental cooling assembly includes a volume of phase change material.

B8.1 The method of paragraph B8, further comprising:
utilizing the endothermic process of the desorbing hydrogen gas from the volume of hydrogen storage material to cool the phase change material.

B8.2 The method of any of paragraphs B8-B8.1, further comprising:
delivering heat from the supplemental cooling assembly to the hydrogen storage device and heating the hydrogen storage material for the desorbing hydrogen gas from the volume of hydrogen storage material.

B8.3 The method of any of paragraphs B8-B8.2, wherein the using the supplemental cooling assembly to cool the energy-consuming device includes delivering heat from the energy-consuming device to the volume of phase change material.

B8.4 The method of any of paragraphs B8-B8.3, wherein the using the supplemental cooling assembly to cool the energy-consuming device includes delivering heat generated by the fuel cell stack to the volume of phase change material.

B8.5 The method of any of paragraphs B8-B8.4, wherein the using the supplemental cooling assembly to cool the energy-consuming device includes delivering heat from a heating assembly to the volume of phase change material.

B8.5.1 The method of paragraph B8.5, wherein the heating assembly includes an electric resistance heater.

B9 The method of any of paragraphs B-B8.5.1, further comprising:
generating, by a fuel processor, hydrogen gas from a feed stream containing at least a carbon-containing feedstock; and
delivering at least a portion of the hydrogen gas generated by the fuel processor to at least one of the hydrogen storage devices for sorption by the volume of hydrogen storage material and the fuel cell stack for production of the electrical output.

B10 The method of any of paragraphs B-B8.5.1, further comprising:
generating, by a fuel processor, hydrogen gas from a feed stream containing at least a carbon-containing feedstock;
after the delivering desorbed hydrogen gas from the hydrogen storage device to the fuel cell stack, delivering hydrogen gas from the fuel processor to the fuel cell stack; and
producing, by the fuel stack, an electrical output from the hydrogen gas delivered from the fuel processor and an oxidant.

B11 The method of any of paragraphs B-B8.5.1, further comprising:
generating, by a fuel processor, hydrogen gas from a feed stream containing at least a carbon-containing feedstock; and
selectively delivering hydrogen gas to the fuel cell stack from one of the hydrogen storage device and the fuel processor in response to a predetermined criterion.

B11.1 The method of paragraph B11, wherein the predetermined criterion includes one of a load applied by the energy-consuming device, a capacity of the fuel cell stack, a capacity of the hydrogen storage device, and a capacity of the fuel processor.

B11.2 The method of paragraph B11, wherein the selectively delivering hydrogen gas to the fuel cell stack includes delivering hydrogen gas to the fuel cell stack from the fuel processor in response to the hydrogen storage device containing insufficient hydrogen gas to satisfy a hydrogen gas demand of the fuel cell stack to satisfy a load applied by the energy-consuming device.

B11.3 The method of paragraph B11, wherein the selectively delivering hydrogen gas to the fuel cell stack includes delivering hydrogen gas to the fuel cell stack from the fuel processor in response to an amount of hydrogen gas sorbed by the hydrogen storage material falling below a predetermined threshold.

B12 The method of any of paragraphs B-B11.3, further comprising:
cooling the volume of hydrogen storage material using an air conditioning system; and
in response to the cooling, sorbing hydrogen gas by the volume of hydrogen storage material from a hydrogen source.

B13 The method of any of paragraphs B-B12, further comprising:
cooling the volume of hydrogen storage material using ambient air from adjacent the fuel cell system; and
in response to the cooling, sorbing hydrogen gas by the volume of hydrogen storage material from a hydrogen source.

C A method of providing power and cooling to an energy-consuming device, the method comprising:
using and/or operating and/or controlling the fuel cell system of any of paragraphs A-A17.

In the event that any of the references that are incorporated by reference herein define a term in a manner inconsistent with either the non-incorporated disclosure of the present application or with any of the other incorporated references, the non-incorporated disclosure of the present application shall control and the term or terms as used therein only control with respect to the patent document in which the term or terms are defined.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

INDUSTRIAL APPLICABILITY

The fuel cell systems and methods disclosed herein are applicable to the fuel cell, telecommunications, and auxiliary power industries.

The invention claimed is:

1. A method of providing power and cooling to an energy-consuming device with a fuel cell system containing a hydrogen storage device, the method comprising:
desorbing hydrogen gas from a volume of hydrogen storage material of a hydride bed of the hydrogen storage device, wherein the desorbing includes delivering a heated air stream heated by the energy-consuming device to the hydrogen storage device to heat the hydrogen storage material;
utilizing the endothermic process of the desorbing hydrogen gas from the volume of hydrogen storage material to cool the energy-consuming device, wherein the utilizing includes delivering a cooled air stream from the hydrogen storage device to the energy-consuming device, wherein the heated air stream and the cooled air stream form a closed loop heat exchange system between the hydrogen storage device and the energy-consuming device; wherein the energy-consuming device includes a telecommunications installation, wherein the telecommunications installation includes an enclosure, and wherein the delivering the cooled air stream includes delivering the cooled air stream to an interior of the enclosure;
delivering desorbed hydrogen gas from the hydrogen storage device to a fuel cell stack;
producing, by the fuel cell stack, an electrical output from the desorbed hydrogen gas and an oxidant;
powering the energy-consuming device with the electrical output from the fuel cell stack;
and wherein the method further comprises:
initiating production of hydrogen gas by a fuel processor responsive to detecting unavailability of a primary power source, wherein initiating occurs for a fuel processor start-up period of time;
generating, by the fuel processor, hydrogen gas from a feed stream containing at least a carbon-containing feedstock; and
after the fuel processor start-up period of time, delivering hydrogen gas from the fuel processor to the fuel cell stack for producing the electrical output.

2. The method of claim 1, further comprising:
delivering at least a portion of the hydrogen gas generated by the fuel processor to the hydrogen storage device for sorption by the volume of hydrogen storage material.

3. The method of claim 2, wherein the delivering at least a portion of the hydrogen gas generated by the fuel processor includes delivering hydrogen gas from the fuel processor to the fuel cell stack in response to an amount of hydrogen gas sorbed by the hydrogen storage material falling below a predetermined threshold.

4. The method of claim 2, wherein the delivering at least a portion of the hydrogen gas generated by the fuel processor includes delivering hydrogen gas from the fuel processor to the hydrogen storage device in response to an amount of hydrogen gas sorbed by the hydrogen storage material falling below a predetermined threshold.

5. A fuel cell system for providing power and cooling to an energy-consuming device including a telecommunications installation with an enclosure, the fuel cell system comprising:
a fuel cell stack configured to produce an electrical output from hydrogen gas and an oxidant;
a hydrogen storage device including a hydride bed having a volume of hydrogen storage material, the hydrogen storage material configured to selectively sorb hydrogen gas for storage in the hydrogen storage device and to selectively desorb hydrogen gas for delivery to the fuel cell stack;
a hydrogen delivery conduit fluidly connecting the hydride bed to the fuel cell stack for delivering desorbed hydrogen gas to the fuel cell stack to produce the electrical output;
a heat exchange system operatively connected to the hydrogen storage device and configured to heat the hydrogen storage material to desorb hydrogen gas for delivery to the fuel cell stack, the heat exchange system further configured to produce a cooled fluid stream from the endothermic process associated with heating the hydrogen storage material and desorbing hydrogen gas from the hydrogen storage material, wherein the heat exchange system includes a cooling conduit for delivering the cooled fluid stream to an interior of the enclosure of the telecommunications installation of the energy-consuming device; and
a control system that controls the operation of the fuel cell system using the method of claim 1;
wherein the heat exchange system further includes a heat delivery conduit for delivering a heated fluid stream heated by the energy-consuming device to the hydrogen storage device for heating the hydrogen storage material to desorb hydrogen gas for delivery to the fuel cell stack;
wherein the cooled fluid stream and the heated fluid stream form a closed loop heat exchange system between the hydrogen storage device and the energy-consuming device;
wherein the cooled fluid stream is a cooled air stream and the heated fluid stream is a heated air stream; and
wherein the system further comprises a fuel processor configured to generate hydrogen gas from a feed stream containing at least a carbon-containing feedstock, the fuel processor operatively coupled to the hydrogen storage device and the fuel cell stack, the fuel processor configured to selectively deliver at least a portion of the hydrogen gas generated by the fuel processor to the hydrogen storage device and the fuel cell stack.

6. The fuel cell system of claim 1, wherein the telecommunications installation includes telecommunications equipment.

7. The fuel cell system of claim 6, wherein the telecommunications equipment is housed in the enclosure.

8. The fuel cell system of claim 5, wherein the control system is configured to selectively deliver hydrogen gas from the fuel processor to the hydrogen storage device when an amount of hydrogen gas sorbed by the hydrogen storage material falls below a predetermined threshold.

9. The fuel cell system of claim 5, wherein the control system is configured to selectively deliver hydrogen gas from the fuel processor to the fuel cell stack when an amount of hydrogen gas sorbed by the hydrogen storage material falls below a predetermined threshold.

10. The fuel cell system of claim 5, wherein the control system is configured so that the fuel cell system provides backup power to the energy-consuming device in response to a primary power source becoming unavailable.

11. A fuel cell system for providing power and cooling to an energy-consuming device including a telecommunications installation with an enclosure, the fuel cell system comprising:
a fuel cell stack configured to produce an electrical output from hydrogen gas and an oxidant;
a hydrogen storage device including a hydride bed having a volume of hydrogen storage material, the hydrogen storage material configured to selectively sorb hydrogen gas for storage in the hydrogen storage device and to selectively desorb hydrogen gas for delivery to the fuel cell stack;
a hydrogen delivery conduit fluidly connecting the hydride bed to the fuel cell stack for delivering desorbed hydrogen gas to the fuel cell stack to produce the electrical output;
a heat exchange system operatively connected to the hydrogen storage device and configured to heat the hydrogen storage material to desorb hydrogen gas for delivery to the fuel cell stack, the heat exchange system further configured to produce a cooled air stream from the endothermic process associated with heating the hydrogen storage material and desorbing hydrogen gas from the hydrogen storage material, wherein the heat exchange system includes a cooling conduit for delivering the cooled air stream to an interior of the enclosure of the telecommunications installation of the energy-consuming device, and wherein the heat exchange system is further configured to deliver a heated air stream to the hydrogen storage device to heat the hydrogen storage material to desorb hydrogen gas for delivery to the fuel cell stack, wherein the cooled air stream and the heated air stream form a closed loop heat exchange system between the hydrogen storage device and the energy-consuming device; and
a control system that controls the operation of the fuel cell system using the method of claim 1,
wherein the control system is configured so that the fuel cell system provides backup power to the energy-consuming device in response to a primary power source becoming unavailable; and wherein the system further comprises a fuel processor configured to generate hydrogen gas from a feed stream containing at least a carbon-containing feedstock, the fuel processor operatively coupled to the hydrogen storage device and the fuel cell stack, the fuel processor configured to selectively deliver at least a portion of the hydrogen as generated by the fuel processor to the hydrogen storage device and the fuel cell stack.

* * * * *

UNITED STATES PATENT AND TRADEMARK OFFICE
CERTIFICATE OF CORRECTION

PATENT NO. : 8,492,042 B2
APPLICATION NO. : 12/629348
DATED : July 23, 2013
INVENTOR(S) : James A. Givens and Arne LaVen Page 1 of 1

It is certified that error appears in the above-identified patent and that said Letters Patent is hereby corrected as shown below:

In the Claims

Column 29, Line 5, in the phrase "of the hydrogen as" please delete "as" and insert --gas-- therefor.

Signed and Sealed this
Twenty-fourth Day of September, 2013

Teresa Stanek Rea
*Deputy Director of the United States Patent and Trademark Office*